(12) United States Patent
Yamada

(10) Patent No.: US 8,258,750 B2
(45) Date of Patent: Sep. 4, 2012

(54) CONSTANT CURRENT CHARGING, FOLLOWED BY CONSTANT VOLTAGE CHARGING, RESPONSIVE TO CONDITION

(75) Inventor: Hironori Yamada, Saitama (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 12/297,780

(22) PCT Filed: Apr. 12, 2007

(86) PCT No.: PCT/JP2007/058096
§ 371 (c)(1),
(2), (4) Date: Oct. 20, 2008

(87) PCT Pub. No.: WO2007/123050
PCT Pub. Date: Nov. 1, 2007

(65) Prior Publication Data
US 2009/0085528 A1    Apr. 2, 2009

(30) Foreign Application Priority Data
Apr. 20, 2006 (JP) .................................. 2006-116673

(51) Int. Cl.
*H02J 7/00* (2006.01)

(52) U.S. Cl. ...................................... 320/128

(58) Field of Classification Search ................... 320/128
See application file for complete search history.

(56) References Cited

U.S. PATENT DOCUMENTS

| | | | | |
|---|---|---|---|---|
| 5,185,565 | A | * | 2/1993 | Uchida .......................... 320/163 |
| 5,703,470 | A | * | 12/1997 | Baranowski et al. .......... 320/152 |
| 2004/0095095 | A1 | * | 5/2004 | Yamamoto et al. ............ 320/128 |
| 2004/0164707 | A1 | | 8/2004 | Veselic et al. |
| 2005/0237024 | A1 | * | 10/2005 | Hogari et al. .................. 320/128 |
| 2006/0187689 | A1 | * | 8/2006 | Hartular ........................... 363/63 |

FOREIGN PATENT DOCUMENTS

| | | |
|---|---|---|
| JP | 1992145841 A | 5/1992 |
| JP | 1996007794 Y2 | 3/1996 |
| JP | 1998051970 A | 2/1998 |
| JP | 1999234922 A | 8/1999 |
| JP | 2006109618 A | 4/2006 |

OTHER PUBLICATIONS

International Search Report for PCT/JP2007/058096 mailed May 15, 2007.
Chinese Office Action for CN200780014078.7 issued Jan. 20, 2011.
International Preliminary Report on Patentability for PCT/JP2007/058096 issued Nov. 17, 2008.
European Search Report for EP07741531 issued on Apr. 30, 2012.

* cited by examiner

*Primary Examiner* — Arun Williams

(57) ABSTRACT

A charging circuit and a charging method by the charging circuit that allow a stable charging operation are provided. The charging method of charging a battery from a charging power supply according to a constant current constant voltage charging system includes the steps of increasing a charging current for each predetermined current level step by step at a time of constant current charging, thereby performing the constant current charging, and stopping the increase of the charging current and continuing the charging maintaining a predetermined minimum chargeable voltage determined by the battery in advance, when it is detected that a supply voltage from the charging power supply has assumed the predetermined minimum chargeable voltage.

15 Claims, 7 Drawing Sheets

CONSTANT CURRENT CHARGING, FOLLOWED BY CONSTANT VOLTAGE CHARGING, RESPONSIVE TO CONDITION

TECHNICAL FIELD

The present invention relates to a charging circuit and its charging method. More specifically, the invention relates to a charging circuit and a charging method for the charging circuit that appropriately drive a charger of a cellular phone handset or the like having a low current supply capability.

BACKGROUND ART

Generally, when a battery for the cellular phone handset or the like is charged, there is provided a constant current constant voltage charging system. This is a charging circuit that charges the battery to a certain battery voltage by constant current charging and then makes transition to constant voltage charging, when the battery is charged. When the charging is performed by a commercially available charger having a low charging current supply capability other than a normal charger in this charging circuit, charging of the battery is performed with a certain large current in consideration of a battery charging completion time, which is one of performance of the cellular telephone handset. Further, when transition to the constant current charging is made, the charging is instantaneously started from precharging, using a certain large current. For this reason, when the transition to the constant current charging is made, a supply voltage on a charger side is reduced to below a chargeable voltage. The charging is thereby stopped. Then, the supply voltage on the charger side is increased due to stop of the constant current charging, whereafter the constant current charging is started again. Start/stop of the charging as described above is thus repeated, so that the battery is not charged.

As conventional art 1, Patent Document 1 (JP Patent Kokai Publication No. JP-A-10-51970) describes a charging system that gradually increases a charging current at a time of trial charging (precharging) (in FIG. 1 in the publication). This charging system is shown in a block diagram in FIG. 5 of this application. In this charging system, a case where a charger 20 is connected to an external power supply 30 of an AC power supply via a connector 4a and a battery 1a is connected to this charger 20 is shown. When the battery 1a is charged using this charger 20, a charging control device 21 controls a charging current $I_B$ supplied from the charger 20 to the battery Ia. The charger 20 converts AC power supplied from the external power source 30 into direct current under control of the charging control device 21 and supplies the direct current to the battery Ia.

The charging control device 21 receives a terminal voltage $V_B$ of the battery 1a from a voltage sensor 22 annexed to the battery 1a and a temperature T of the battery 1a from a temperature sensor 23 annexed to the battery 1a. Then, according to these voltage $V_B$ and temperature T, the charging control device 21 controls the charging current $I_B$ of the charger 20. A limiter 24 that is used together with the charging control device 21 supplies a command to the charging control device 21 when the terminal voltage $V_B$ detected by the voltage sensor 22 has increased to a predetermined limiter operating voltage $V_{LIM}$, thereby stopping charging of the battery Ia by the charger 20. The limiter 24 thereby prevents overvoltage of the battery 1a.

The charging control device 21 first determines whether or not the temperature T obtained by the temperature sensor 23 is above a charging default temperature $T_0$, at a time of starting charging. In this conventional art 1, there is no problem when $T > T_0$ holds (when the temperature of the battery 1a is higher). When $T > T_0$ does not hold (when the temperature of the battery Ia is lower), the terminal voltage $V_B$ may increase in a comparatively rapid manner with progress of the charging. Accordingly, the charging control device 21 exercises control so that trial charging is performed.

When $T > T_0$ holds, the charging control device 21 exercises control so that a value of the charging current $I_B$ assumes a predetermined current value $I_k$. Herein, it is set that the more a number k increases, the more the current value $I_k$ is reduced. The charging control device 21 maintains this control state until $V_B \geq V_{BT}$ holds as a result of the terminal voltage $V_B$ having increased with the progress of charging. When $V_B \geq V_{BT}$ is established, the charging control device 21 executes a predetermined charging completion process. When $T > T_0$ does not hold, i.e., when it is determined that the temperature T of the battery Ia is comparatively low, the terminal voltage $V_B$ may increase in the comparatively rapid manner with the progress of charging. Thus, the charging control device 21 exercises control so that the trial charging is performed.

When the charging control device 21 exercises control so that the trial charging is performed, the charging control device 21 sequentially increment an order number j, determines a duration $t_j$ based on correspondence between the temperature T and the duration $t_j$, and exercises control so that the charging current $I_B$ becomes current $i_j$. Herein, the duration $t_j$ is a duration in a stage where the battery 1a is charged with a constant current $i_j$. The correspondence between the duration $t_j$ and the temperature T is set so that the more the temperature T is increased, the more the duration $t_j$ is reduced. It is further set that the more the number j is increased, the more the duration $t_j$ is increased. The charging control device 21 maintains this control state until $V_B \geq V_{BT}$ or $t \geq t_j$ holds. When $t \geq t_j$ holds, the charging control device 21 sequentially increases the number j one by one. Then, when $V_B \geq V_{BT}$ holds, the charging control device 21 determines whether or not there is the current $I_k$ which satisfies $I_k < i_j < I_{k-1}$. When such $I_k$ is present, the charging control device 21 exercises control so that a value of the charging current $I_B$ assumes the predetermined current value $I_k$. When such the current $I_k$ is not present, i.e., when $i_j$ is smaller than a current value $I_n$, for example, the charging control device 21 finishes operation.

Patent Document 1: JP Patent Kokai Publication No. JP-A-10-51970

DISCLOSURE OF THE INVENTION

Problems to be Solved by the Invention

It is deemed that disclosed contents of the patent document 1 described above are incorporated herein by reference and described.

A charging procedure in conventional art 1 will be described, using a timing diagram in FIG. 6 shown in this application. An operation analysis according to the present invention will be further added as follows.

First, assume that $T > T_0$ does not hold and the number j is sequentially incremented. Then, when a condition of $V_B \geq V_{BT}$ and a condition of $i_j = I_1$ do not hold, the charging procedure described above is performed. In this procedure, the trial charging with the current $i_j$, each of which continues for just a duration $t_j$, is executed under the condition j=1, 2, . . . m−1 (where m is a natural number larger than one) i.e., until the number j reaches m−1 from one. Then, main charging using a procedure similar to conventional multi-stage constant current charging is executed. An arrow indicating "AH achievement" in FIG. 6 indicates that a sufficient charging current amount has been obtained by charging with a current $I_n$.

In conventional art 1, as described above, when the temperature T of the battery 1a is determined to be comparatively low, the trial charging where the value of the charging current $I_B$ is gradually increased prior to the main charging. For this reason, such a situation will occur hardly where the terminal voltage $V_B$ is abruptly increased immediately after start of the main charging and the limiter 24 is operated. However, conventional art 1 relates to a charging system that gradually increases the charging current at a time of the trial charging. In this charging system, though operation of the limiter 24 is made hardly to occur, the limiter 24 cannot be eliminated.

FIG. 7 shown in this application is a block diagram explaining a configuration of a charging circuit in conventional art 2. FIG. 8 is a flowchart explaining an operation of the charging circuit. In this charging circuit, in order to charge a battery 1 of a cellular phone handset, for example, a charger (charging power supply; not shown) is connected to a connector 4. This circuit detects a charging current flowing through a charging current detecting resistance 3, and controls an FET2 directly connected to an input side of the battery 1 using this charging current. A charger detection circuit 5, a charging current monitoring circuit 6, a voltage monitoring circuit 7, a constant current constant voltage charging circuit 8, a constant current reference power supply 9a, a constant voltage reference power supply 10, and a charging control circuit 11b are included, as circuits for the control.

The charger detection circuit 5 is formed of a comparator, which detects that a charger is connected to the connector 4. The charging current monitoring circuit 6 monitors the charging current based on a potential difference generated at the charging current detecting resistance 3. The voltage monitoring circuit 7 monitors an output voltage of the FET 2. The constant voltage reference power supply 10 outputs a reference voltage for adjusting a charging voltage at a time of constant voltage charging. The constant current reference power supply 9a outputs a reference current. The constant current constant voltage charging circuit 8 exercises two types of charging control of constant current charging and constant voltage charging through the FET 2. In the constant current charging, the charging current is controlled according to a result of monitoring by the charging current monitoring circuit 6 and a current value of the constant current reference power supply 9a. In the constant voltage charging, a charging voltage is controlled according to a result of monitoring by the voltage monitoring circuit 7 and the constant voltage reference power supply 10. The charging control circuit 11b exercises control over an entire circuit including each of the reference power supplies 9a and 10 and the constant current constant voltage charging circuit 8.

In this conventional art 2, when the charger is connected to the connector 4, the charger detection circuit 5 detects the connection of the charger (in step S1). Then, a voltage value of a constant current reference D/A converter is changed to a voltage value for precharging using control of the charging control circuit 11b, and precharging is started (in step S2). Next, it is determined whether or not a voltage value monitored by the voltage monitoring circuit 7 is at a threshold level for transition to constant current charging (in step S3). When the voltage value does not reach the threshold level or higher (NO), the precharging is maintained. When the voltage value reaches the threshold level or higher (YES), transition to the constant current charging is made by the charging control circuit 11b (in step S4).

Next, it is determined in step S11a that the voltage value monitored by the voltage monitoring circuit 7 has reached a threshold level for transition to the constant voltage charging, or higher. When the voltage value equals or exceeds the threshold level (YES), the constant current constant voltage charging circuit 8 performs the constant voltage charging (in step S12). Then, it is determined next that the voltage value has reached a threshold level for transition to completion of the charging (in step S13). Then, when the voltage value has reached the threshold level for transition to completion of the charging (YES), the charging is completed (in step S14). As described above, a charging operation may be performed.

Conventional art 1 described above relates to a charging system that gradually increases the charging current at the time of the trial charging, which hardly results in occurrence of a situation where the terminal voltage $V_B$ is abruptly increased immediately after the start of the main charging and the limiter 24 is operated. However, this charging system also needs the limiter 24 that accommodates a sudden rise of the terminal voltage $V_B$. Accordingly, there is a problem that a circuit configuration cannot be simplified.

In conventional art 2, the battery is charged with a certain large current. Further, when transition to the constant current charging is made, the charging is instantaneously started from precharging, using a certain large current. However, among commercially available chargers, there is also a charger having the low charging current supply capability like that in the charging circuit of the cellular phone handset in particular. In such a charger having the low charging current supply capability, when the transition to the constant current charging is made, the supply voltage on the charger side is reduced to below the chargeable voltage. The charging is thereby stopped. Then, the supply voltage on the charger side is increased due to the stop of the constant current charging. Then, the constant current charging is started again. Accordingly, there is a problem that start/stop of the charging is thus repeated, so that the battery is not charged.

It is a main object of the present invention to provide a charging circuit and a charging method thereafter that allow a stable charging operation.

Means to Solve the Problems

According to a first aspect of the present invention, there is provided a charging circuit that charges a battery from a charging power supply according to a constant current constant voltage charging system. The charging circuit includes: a charging current setting circuit that sets a charging current for each predetermined current level step by step at a time of constant current charging; a charging voltage measurement circuit that measures a supply voltage from the charging power supply; and control means. The control means performs constant current charging by increasing the charging current for each predetermined current level step by step at the time of the constant current charging, and when the control means detects that the supply voltage from the charging power supply has assumed a predetermined minimum chargeable voltage determined by the battery in advance, the control means stops the increase of the charging current and continues the charging maintaining the predetermined minimum voltage.

In the present invention, the control means may include a control element that controls the charging current and a charging voltage of the battery and a control circuit. The control circuit may control the control element so that the control element has a set value of the charging current, and when the control means detects that the supply voltage from the charging power supply has assumed the predetermined minimum voltage determined by the battery in advance, the control circuit may control the control element so that the increase of the charging current is stopped and the charging is continued maintaining the predetermined minimum voltage. The control circuit may include a CPU, and the CPU may store the set values that control the charging current step by step and the predetermined minimum voltage determined by the battery in advance, and may instruct to measure the supply voltage and to make determination with respect to the increase of the charging current. The charging voltage measurement circuit may be formed of a voltage measurement A/D converter that measures the supply voltage on a side of the charging power supply.

According to a second aspect of the present invention, a charging circuit that charges a battery from a charging power supply according to a constant current constant voltage charging system includes: a charging current setting circuit that sets a charging current for each predetermined current level step by step at a time of constant current charging; a voltage detection circuit which detects that a supply voltage from the charging power supply has assumed a predetermined minimum chargeable voltage determined by the battery in advance; and control means. The control means performs constant current charging by increasing the charging current for each predetermined current level step by step at the time of the constant current charging, and when the voltage detection circuit detects the predetermined minimum voltage, the control means stops the increase of the charging current and continues charging maintaining the predetermined minimum voltage.

In the present invention, the control means may include a control element that controls the charging current and a charging voltage of the battery and a control circuit. The control circuit may control the control element so that the control element has a set value of the charging current, and when the voltage detection circuit detects the predetermined minimum voltage, the control circuit may control the control element so that the increase of the charging current is stopped and the charging is continued maintaining the predetermined minimum voltage. The control circuit may include a CPU, and the CPU may instruct to make determination with respect to the increase of the charting current. The control circuit may control the charging current step by step based on a time set by a timer. The control element may be formed of an FET connected between the charging power supply and the battery. The charging current setting circuit may be formed a constant current reference D/A converter that sets the charging current to be controlled for each predetermined current level step by step.

According to a third aspect of the present invention, in a charging circuit for a cellular phone handset, a battery for the cellular phone handset is connected as the battery for the charging circuit described above.

According to a further fourth aspect of the present invention, there is provided a charging method of charging a battery from a charging power supply according to a constant current constant voltage charging system. The charging method includes the steps of: increasing a charging current for each predetermined current level step by step at a time of constant current charging, thereby performing the constant current charging; and stopping the increase of the charging current and continuing the charging maintaining a predetermined minimum chargeable voltage determined by the battery in advance, when it is detected that a supply voltage from the charging power supply has assumed the predetermined minimum voltage.

In a process of increasing the charging current step by step, the present invention may include the steps of: measuring the supply voltage from the charging power supply in each step; and detecting that the supply voltage from the charging power supply has assumed the predetermined minimum chargeable voltage determined by the battery. Further, the charging method may include the steps of: determining whether to increase the charging current or not, based on a result of measurement of the supply voltage from the charging power supply; increasing the charging current for each predetermined current level step by step when it is determined that the charging current may be increased; and stopping the increase of the charging current and maintaining the charging current when it is determined that the charging current cannot be increased. A battery for a cellular phone handset may be charged using the charging method described above.

Effect of the Invention

As described above, according to the present invention, at a time of starting the constant current charging, it is determined whether or not to increase the charging current, based on the measurement result of the supply voltage on the charger side while repeating measurement of the supply voltage on the charger side and increase of the charging current under CPU control. Then, the charging current is so adjusted as to be suitable for the charger. Charging with the charging current optimal for the attached charger thereby becomes possible, without repeating start/stop of the charging.

BRIEF DESCRIPTION OF DRAWINGS

DESCRIPTION OF REFERENCE NUMERALS 1, 1a battery
2 FET
3 charging current detecting resistance
4, 4a connector
5 charger detection circuit
6 charging current monitoring circuit
7 voltage monitoring circuit
8 constant current constant voltage charging circuit
9 constant current reference D/A converter
9a constant current reference power supply
10 constant voltage reference power supply
11, 11a, 11b charging control circuit
12 voltage measurement A/D converter 13 CPU
14 voltage detection circuit
15 timer
20 charger
21 charging control device
22 voltage sensor
23 temperature sensor
24 limiter
30 external power supply Preferred Modes for Carrying Out the Invention Next, an exemplary embodiment of the present invention will be described using drawings. FIG. 1 is a block diagram showing the exemplary embodiment of the present invention. This exemplary embodiment has a feature that a charging current at a time of charging is increased step by step, a supply voltage of a charger during a process of increasing this charging current step by step is measured, and when it is detected that the supply voltage has assumed a predetermined minimum chargeable voltage determined by a battery in advance, the increase of the charging current is stopped and the charging is continued while maintaining the predetermined minimum voltage.

As shown in FIG. 1, in this exemplary embodiment, a battery 1, which serves as a power supply for a cellular phone handset, for example, is charged, as in FIG. 5 in a conventional art. Thus, a charger (charging power supply; not shown) is connected to a connector 4. This circuit detects the charging current flowing through a charging current detecting resistance 3, and controls an FET 2 directly connected to an input side of the battery 1 using this charging current. As a circuit for this control, a charging control circuit 11 is controlled by a CPU 13. In order to apply this CPU 13, a voltage measurement A/D converter 12 that detects a charging voltage and a constant current reference D/A converter 9 are employed. Other control circuits are similar to those in FIG. 5 [sic. FIG. 7], and include a charger detection circuit 5, a charging current monitoring circuit 6, a voltage monitoring circuit 7, a constant current constant voltage charging circuit 8, and a constant voltage reference power supply 10.

Figure 1:
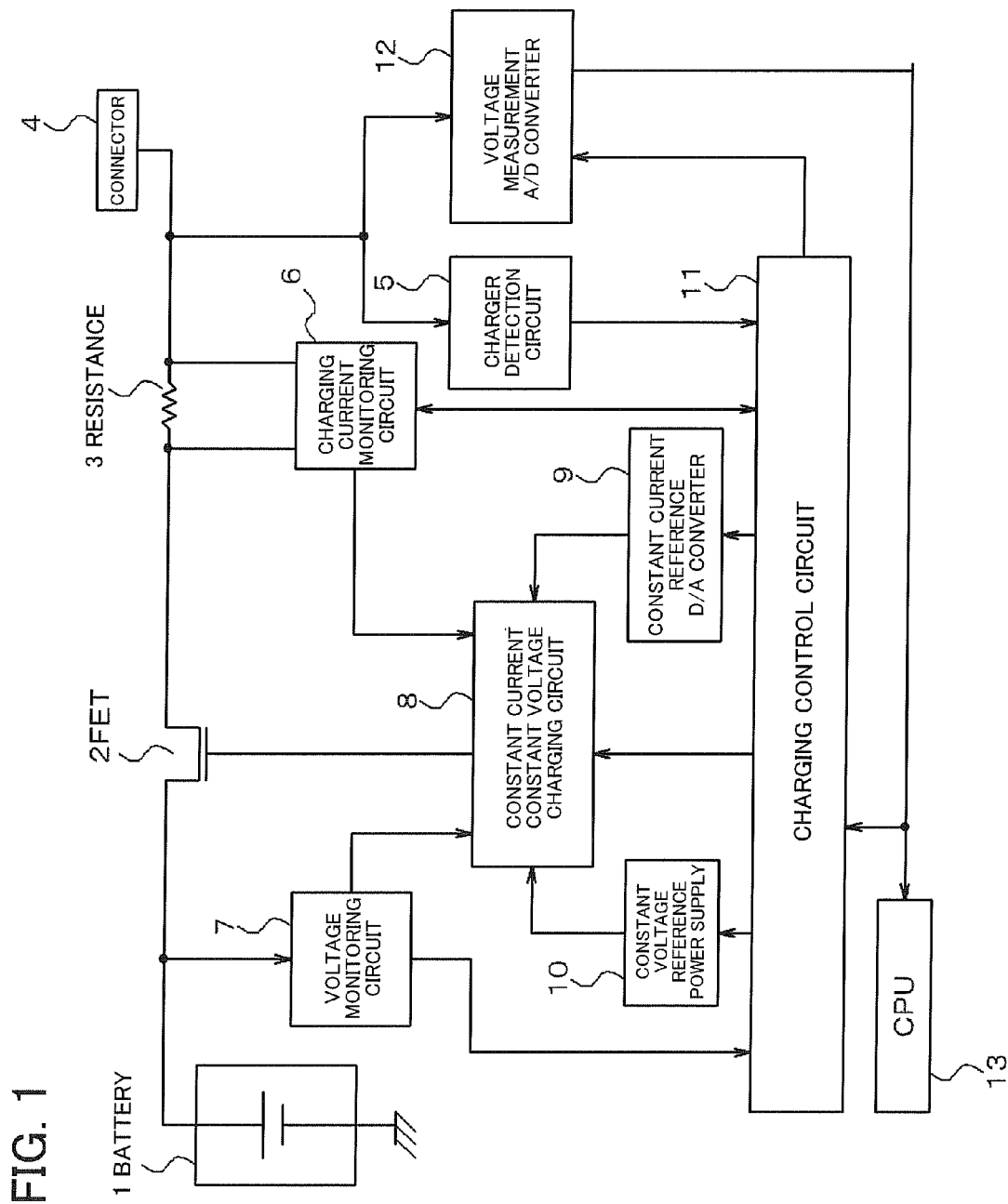
FIG. 1 is a block diagram of a charging circuit explaining a first exemplary embodiment of the present invention.

The charger detection circuit 5 is formed of a comparator, a detector, or the like. The charger detector circuit 5 detects connection of the charger. The voltage measurement A/D converter 12 measures a supply voltage from the charger, in response to this detection of the charger. The charging current detecting resistance 3 detects a potential difference caused by the charging current. The charging current monitoring circuit 6 monitors the charging current, using the potential difference generated at the charging current detecting resistance 3. A voltage value of the constant current reference D/A converter 9 may be changed and becomes a reference for charging current adjustment in constant current charging, precharging, and constant current saved charging. The constant voltage reference power supply 10 becomes a reference for charging voltage adjustment at a time of constant voltage charging.

The voltage monitoring circuit 7 is formed of a comparator, and monitors a voltage and a charging voltage of the battery 1. The constant current constant voltage charging circuit 8 executes two types of charging control by adjustment of the FET 2. One type of the charging control is constant current control over the charging current using a result of monitoring by the charging current monitoring circuit 6 and the voltage value of the constant current reference D/A converter 9. The other type of charging control is constant voltage control over the charging voltage using a result of monitoring by the voltage monitoring circuit 7 and the constant voltage reference power supply 10. The charging control circuit 11 controls voltage switching of the constant current reference D/A converter 9 and the overall charging circuit including the constant current constant voltage charging circuit 8.

The CPU 13 receives the predetermined minimum chargeable voltage determined by a battery in advance at a time of the constant current charging and timings of switching the charging current step by step at the time of the charging, from an input circuit (not shown) and stores a received predetermined minimum chargeable voltage and timings of switching the charging current step by step. According to these data, the CPU 13 instructs the voltage measurement A/D converter 12 to measure the supply voltage of the charger and also instructs the charging current control circuit 11 to make determination with respect to increase of the charging current. In the case of the cellular phone handset, the CPU 13 performs a basic operation of the cellular phone handset.

In this exemplary embodiment, a charger having a low charging current supply capability other than a normal charger is attached to the connector 4. When the battery 1 is charged, the voltage measurement A/D converter 12 measures a supply voltage on a charger side at a time of starting the constant current charging, according to an instruction from the CPU 13. Based on a result of this supply voltage measurement, the CPU 13 determines whether or not to increase the charging current. When the CPU 13 determines that the charging current may be increased, the CPU 13 changes the voltage of the constant current reference D/A converter 9, and increases the charging current in one step. The CPU 13 repeats instructing measurement of the supply voltage on the charger side by the voltage measurement A/D converter 12 and increasing the charging current according to a result of measurement, and increases the charging current step by step toward a maximum value of the charging current in the constant current charging. Then, when it is determined that the charging current cannot be increased based on a result of measurement of the supply voltage on the charger side during a process of increasing the charging current toward the maximum value of the charging current in the constant current charging, the charging current at that point is maintained, and the charging is performed.

That is, in this exemplary embodiment, charging is performed in the order of battery charging, precharging, constant current charging 1, constant current charging 2, constant current charging n, and constant voltage charging. Then, the charging is completed.

In this exemplary embodiment, when transition to the constant current charging is made, the charging current is increased from 100 mA to 200 mA, for example. Then, the charging current is increased from 200 mA to 300 mA, for example. In this case, when the charging current is set to 100 mA, the CPU 13 causes the voltage on the charger side to be measured. When the voltage on the charger side exceeds 4.5V, the CPU 13 causes the charging current to be increased to 200 mA. Then, when the charging current is set to 200 mA, the voltage on the charger side is measured again. The charging current is then increased. Then, the constant current charging is performed using current setting when the voltage on the charger side has assumed approximately 4.6V In this case, the CPU grasps the voltage value on the charger side. Accordingly, charging with the charging current optimal for the charger becomes possible.

On contrast therewith, conventionally, charging is performed in the order of battery charging, precharging (with a certain small current), constant current charging (with a certain large current), and constant voltage charging. Then, the charging is completed. Assume that the chargeable voltage of the charging circuit is set to 4.5V, for example. Then, when current supply capability on the charger side is half the charging current in the constant current charging at a time of transition to the constant current charging in a conventional charging circuit, the charging current cannot be supplied, so that the voltage on the charger side is reduced to below a chargeable voltage. The charging cannot be therefore performed.

In this exemplary embodiment, the supply voltage on the charger side is measured by the voltage measurement A/D converter 12. Then, it is determined whether or not to increase the charging current, using the measured voltage value. When it is determined that the charging current may be increased, the charging current is increased. Then, when it is determined by the CPU 13 that the charging current cannot be increased as the result of measurement of the supply voltage on the charger side by the voltage measurement A/D converter 12, the CPU 13 sends an instruction for maintaining the charging current to the charging control circuit 11. Then, by maintaining the voltage value of the constant current reference D/A converter 9 at that point, the charging current is maintained. Accordingly, the constant current charging of the battery can be performed with the charging current optimal for the attached charger, without repeating stat/stop of the charging.

Further, when charging is performed using the normal charger or the charger having a high charging current supply capability, the CPU 13 determines that the charging current may be increased to a maximum value of the charging current in the constant current charging, based on the supply voltage on the charger side. In this case, it becomes possible to perform charging at the maximum value of the charging current in the constant current charging. A charging time of the battery or the like is not therefore affected. Further, the CPU 13 recognizes the supply voltage value on the charger side and a case where the maximum value of the charging current in the constant current charging is not attained. Thus, in such a case where the maximum value of the charging current in the constant current charging is not attained, the CPU 13 may cause a display unit or the like to inform that the charger is not the normal charger or there is abnormality in the charger by display or announcement.

FIRST EXAMPLE

Figure 2:
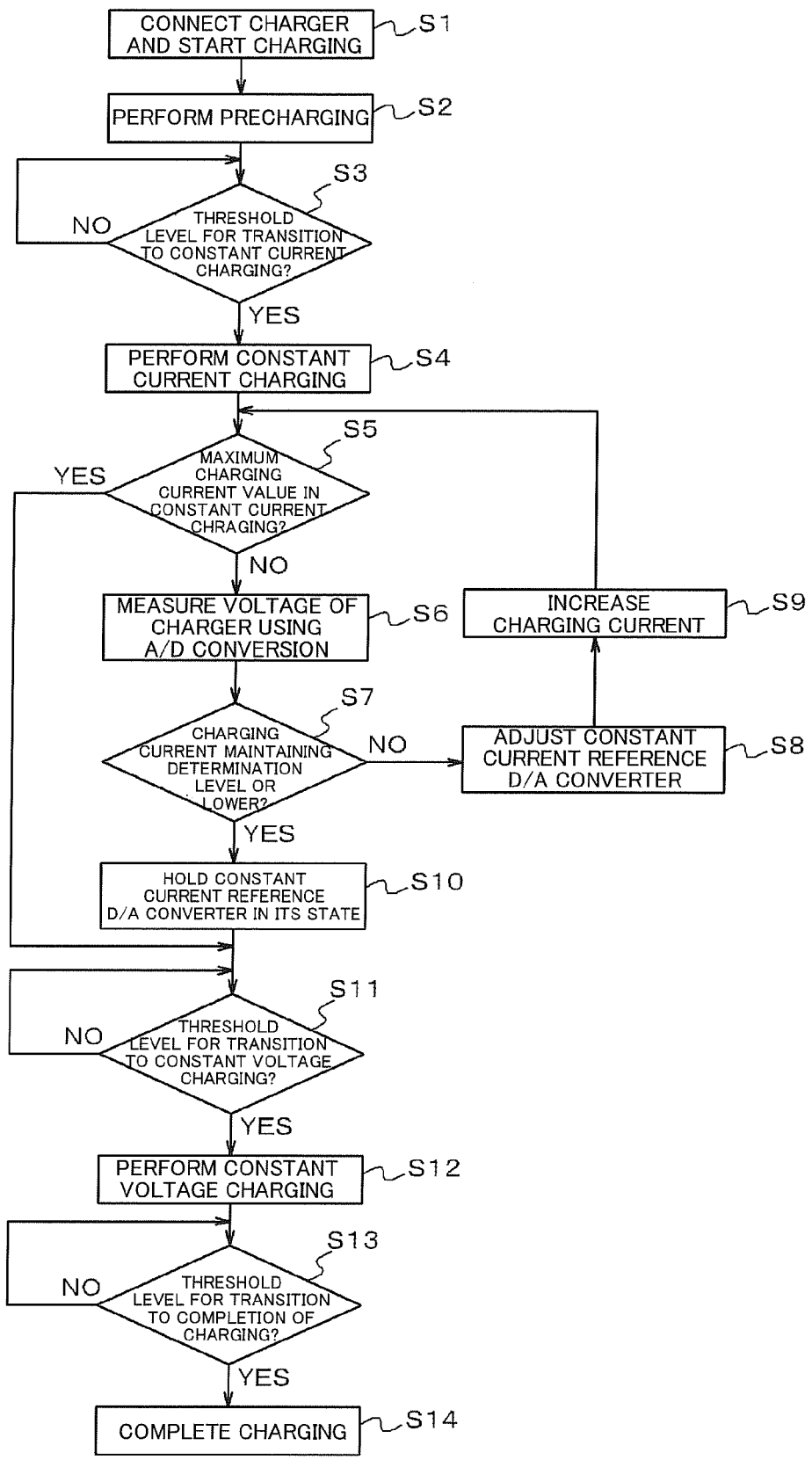
FIG. 2 is a flowchart explaining an operation of the charging circuit in FIG. 1.

A detailed operation in this exemplary embodiment will be described based on an operation flowchart in a first example in FIG. 2.

Figure 3A:
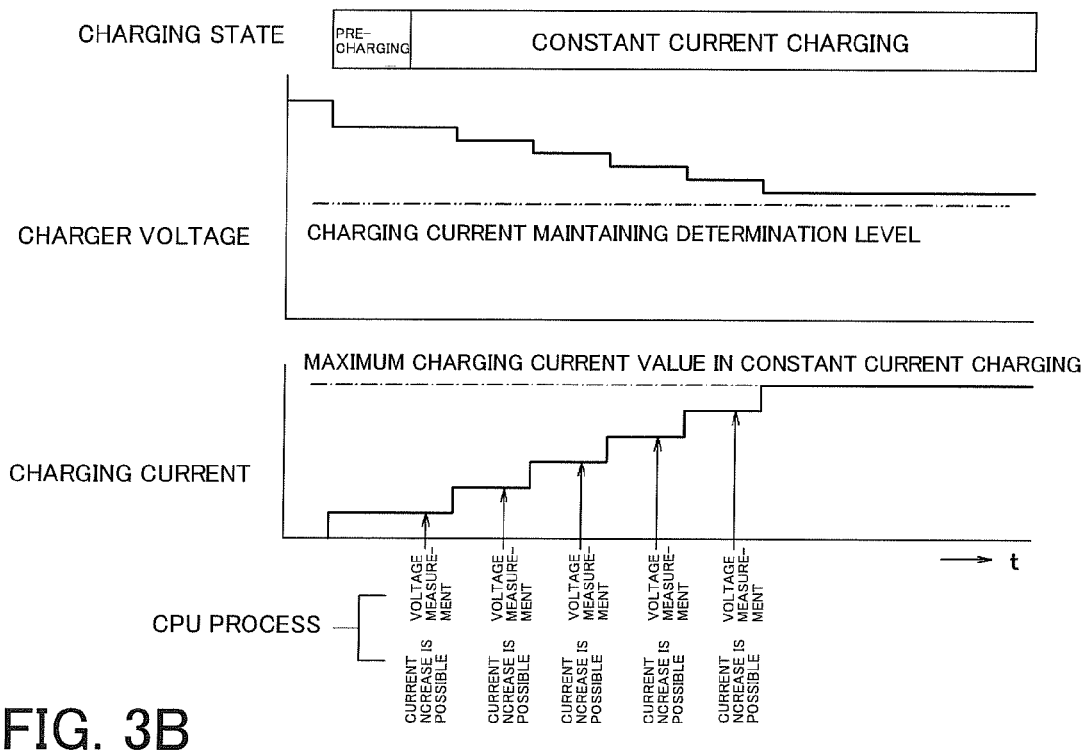
FIG. 3A includes characteristic diagrams showing changes in a voltage and a current in a normal charger.
Figure 3B:
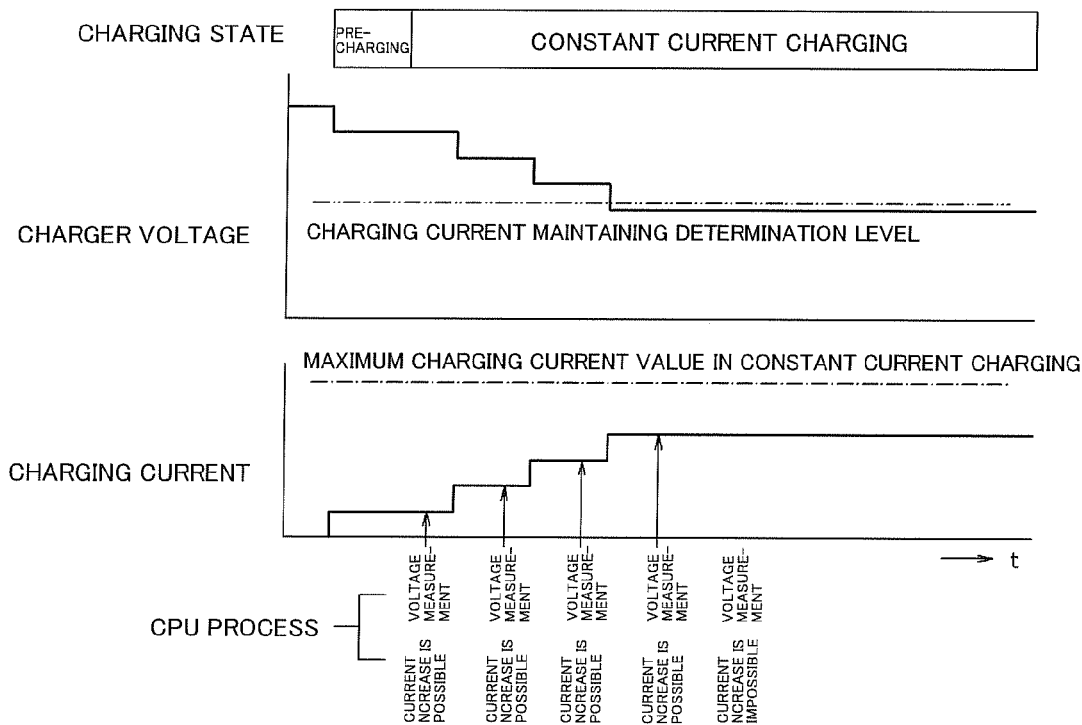
FIG. 3B includes characteristic diagrams showing changes in the voltage and the current in a charger having a low current supply capability.

Each of FIGS. 3A and 3B includes characteristic diagrams of a charger supply voltage and a charging current. FIG. 3A includes graphs that explain an operation when a normal charger is employed, while FIG. 3B includes graphs that explain an operation when a charger having a low current supply capability other than the normal charger is employed. In the first example, when the charger is connected to a connector 4, a charger detection circuit 5 detects connection of the charger (in step S1). Precharging is then started with a voltage value of a constant current reference D/A converter 9 used as a voltage value for the precharging by control of the charging control circuit 11 (in step S2). Next, it is determined whether or not a voltage value monitored by a voltage monitoring circuit 7 has become a threshold level for transition to constant current charging (in step S3). When it is determined that the voltage value has not reached the threshold level or higher (NO) in step S3, the precharging is maintained. When it is determined that the voltage value has reached the threshold level or higher (YES), transition to the constant current charging is made by the charging control circuit 11 (in step S4).

Then, in step S5, it is determined whether or not the voltage value of the constant current reference D/A converter 9 has reached the maximum value of the charging current in the constant current charging. When it is determined that the value of the constant current reference D/A converter 9 has not reached the maximum value of the charging current in the constant current charging (NO), the CPU 13 causes the voltage measurement A/D converter 12 to measure a supply voltage on a charger side (in step S6). The CPU 13 compares the supply voltage with a charging current maintaining determination level based on the measurement result of the voltage (in step S7). When the measurement result of the voltage is higher than the charging current maintaining determination level (NO), the CPU 13 determines that the charging current may be increased. Then, the CPU 13 sends an instruction to the charging control circuit 11 to adjust the constant current reference D/A converter 9 (in step S8), thereby increasing the charging current (in step S9). Then, the operation is returned to step S5. After repetition of steps S6 to S9, the operation proceeds to a branch YES of step S5.

When the measurement result of the supply voltage on the charger side is continued to be determined by the CPU 13 that the charging current may be increased, and increase of the charging current is repeated to reach the maximum value of the charging current in the constant current charging as in FIG. 3A (YES in step S5), normal constant current charging is performed.

When the voltage value monitored by the voltage monitoring circuit 7 has reached the threshold level for transition to the constant voltage charging or higher, the constant current constant voltage charging circuit 8 performs the constant voltage charging. The constant current constant voltage charging circuit 8 performs the charging operation until completion of the charging. More specifically, in step S11, it is determined whether or not the voltage value monitored by the voltage monitoring circuit 7 has reached the threshold level for transition to the constant voltage charging. When the voltage value has reached the threshold level or higher (YES), the constant current constant voltage charging circuit 8 performs the constant voltage charging (in step S12). Then, it is determined whether or not the voltage value has reached a threshold level for transition to completion of the charging (in step S13). Then, when the voltage value has reached the threshold level for transition to completion of the charging (YES), the charging is completed (in step S14). The charging operation thus can be performed.

When the measurement result of the supply voltage becomes the charging current maintaining determination level or lower and the CPU 13 determines that the charging current cannot be increased during repetition of measurement of the supply voltage on the charger side and increase of the charging current under control of the CPU 13 toward the maximum value of the charging current in the constant current charging as in FIG. 3B (YES in step S7), the CPU sends an instruction to the charging control circuit 11 to hold the constant current reference D/A converter 9 in its state at that point, thereby maintaining the charging current at that point (in step S10).

During the constant current charging in which the charging current is maintained as described above (in step S10), it is determined whether or not the supply voltage on the charger side at the charger voltage monitoring circuit 7 has reached the threshold level for transition to the constant voltage charging, in step S11. Then, when it is determined that the supply voltage has reached the threshold level for transition to the constant voltage charging or higher (YES in step S11), the constant current constant voltage charging circuit 8 performs the constant voltage charging in step S12. Then, it is determined in step S13 whether or not the supply voltage has reached the threshold level for transition to completion of the charging. When it is determined that the supply voltage has reached the threshold level or higher (YES), the charging is completed in step S14. In other words, the charging operation is performed until the charging is completed (in step S14).

SECOND EXAMPLE

Figure 4:
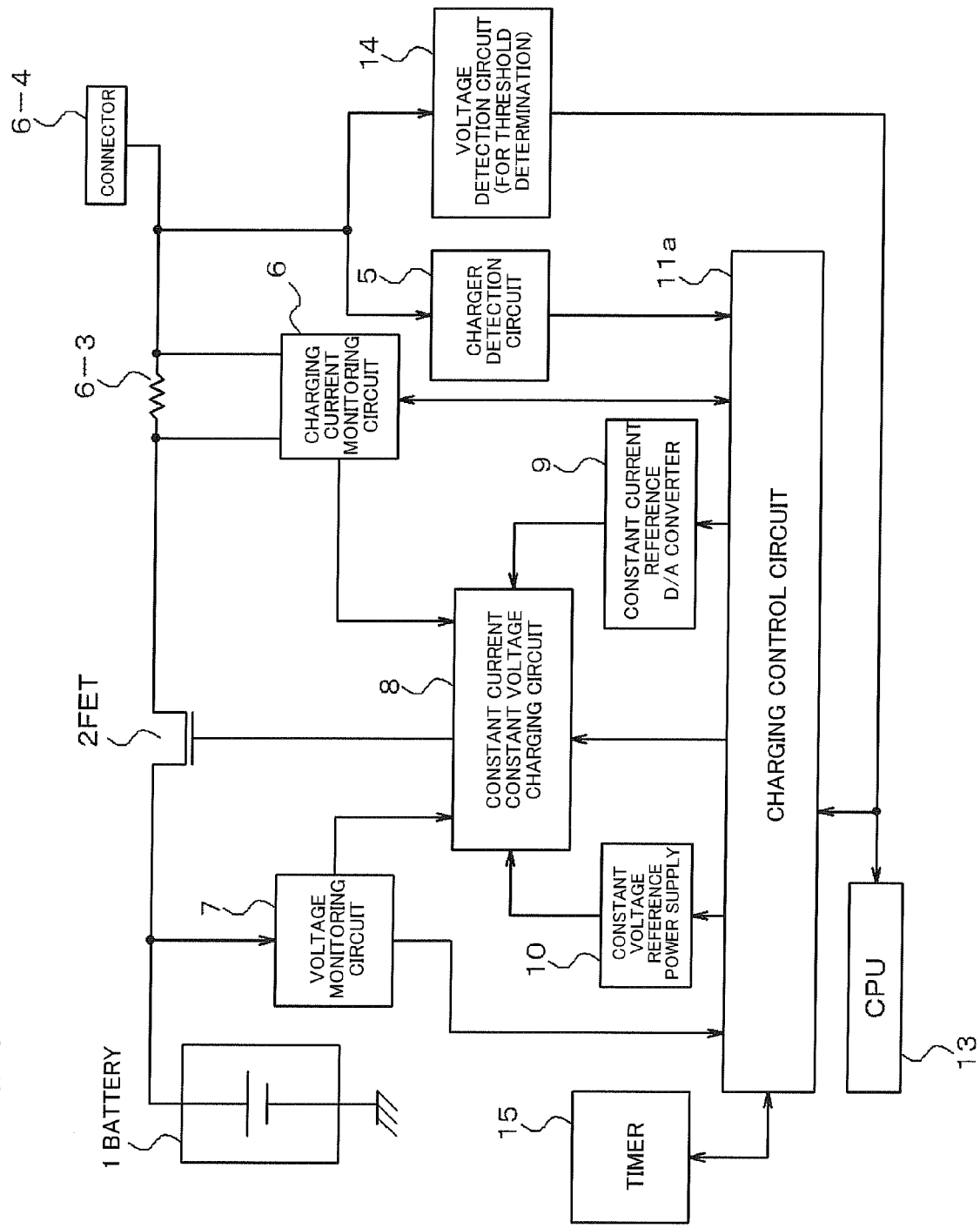
FIG. 4 is a block diagram of a charging circuit explaining a second example of the present invention.
Figure 5:
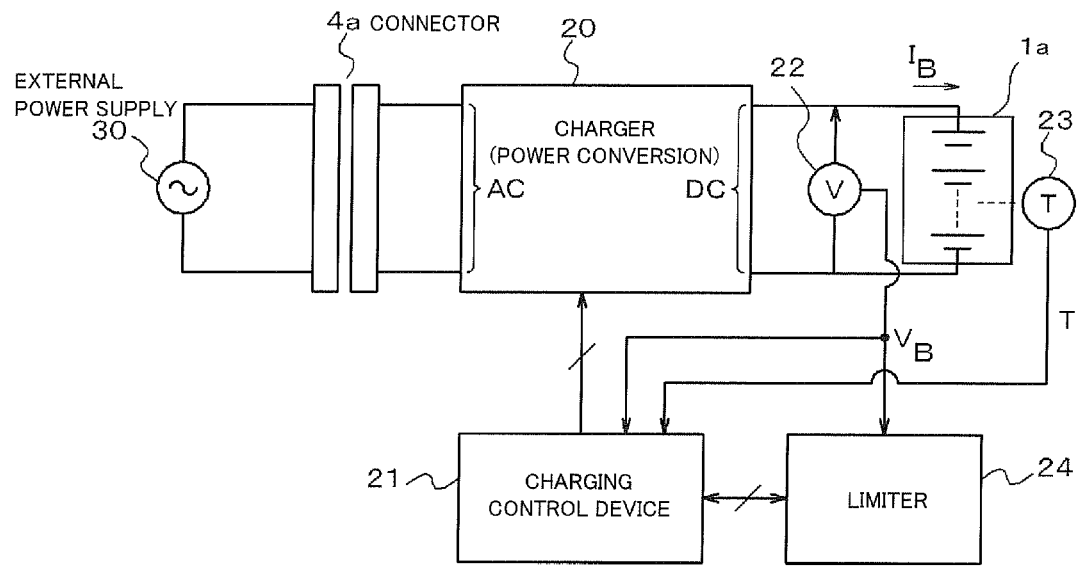
FIG. 5 is a block diagram explaining a charging system in conventional art 1.
Figure 6:
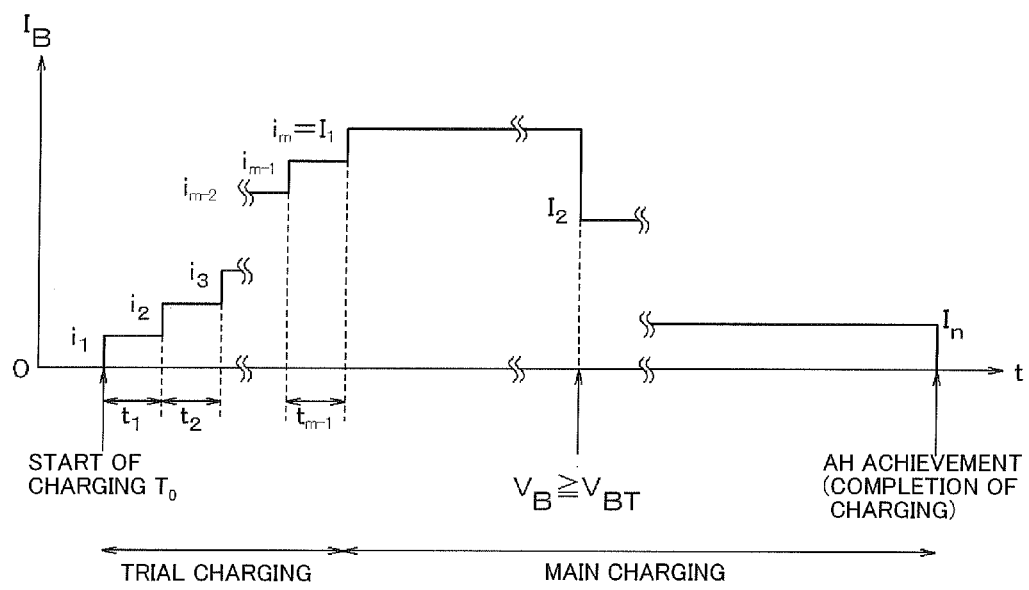
FIG. 6 is a timing diagram explaining an operation characteristic of the charging system in FIG. 5.
Figure 7:
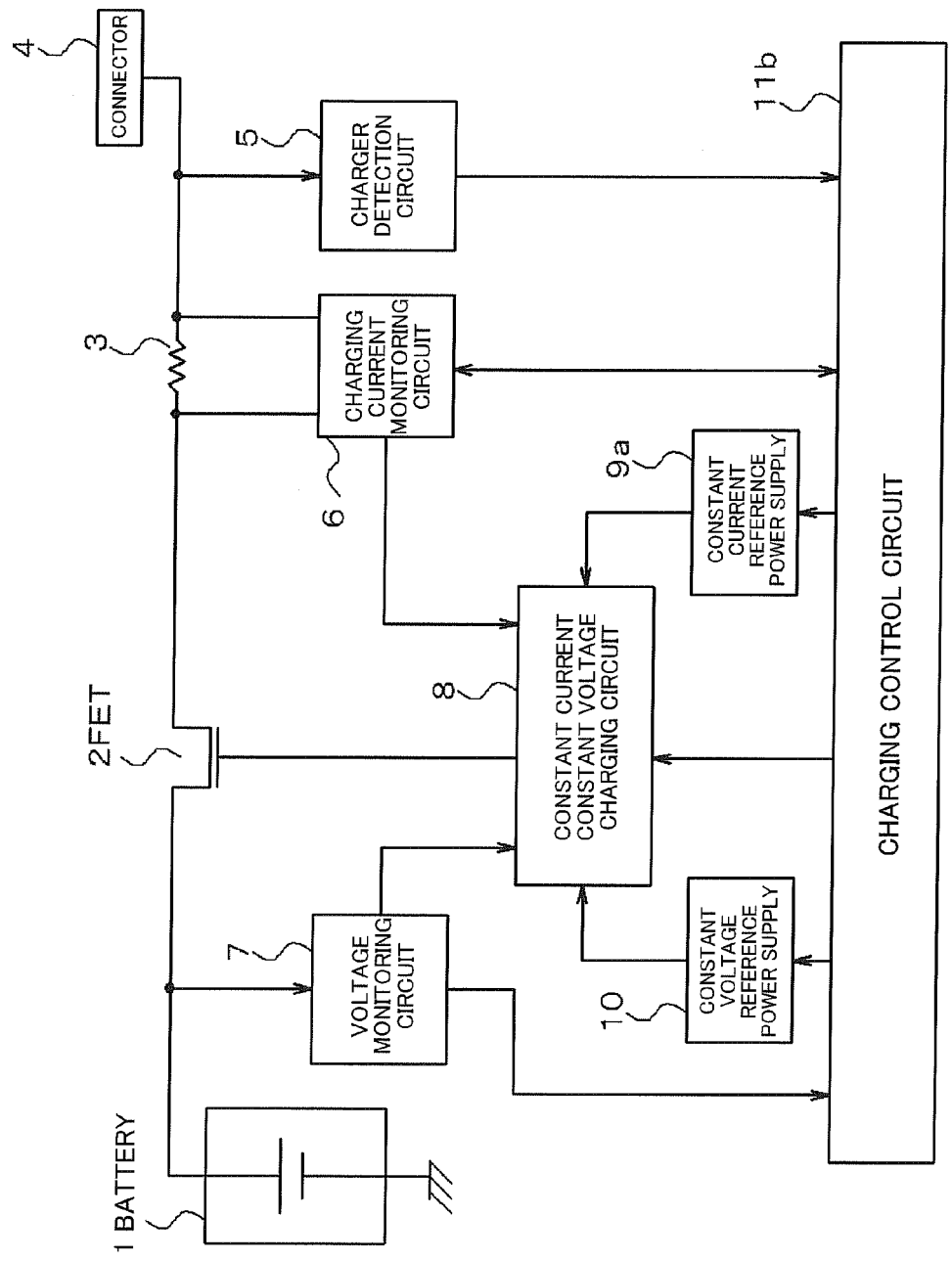
FIG. 7 is a block diagram explaining a charging circuit in conventional art 2.
Figure 8:
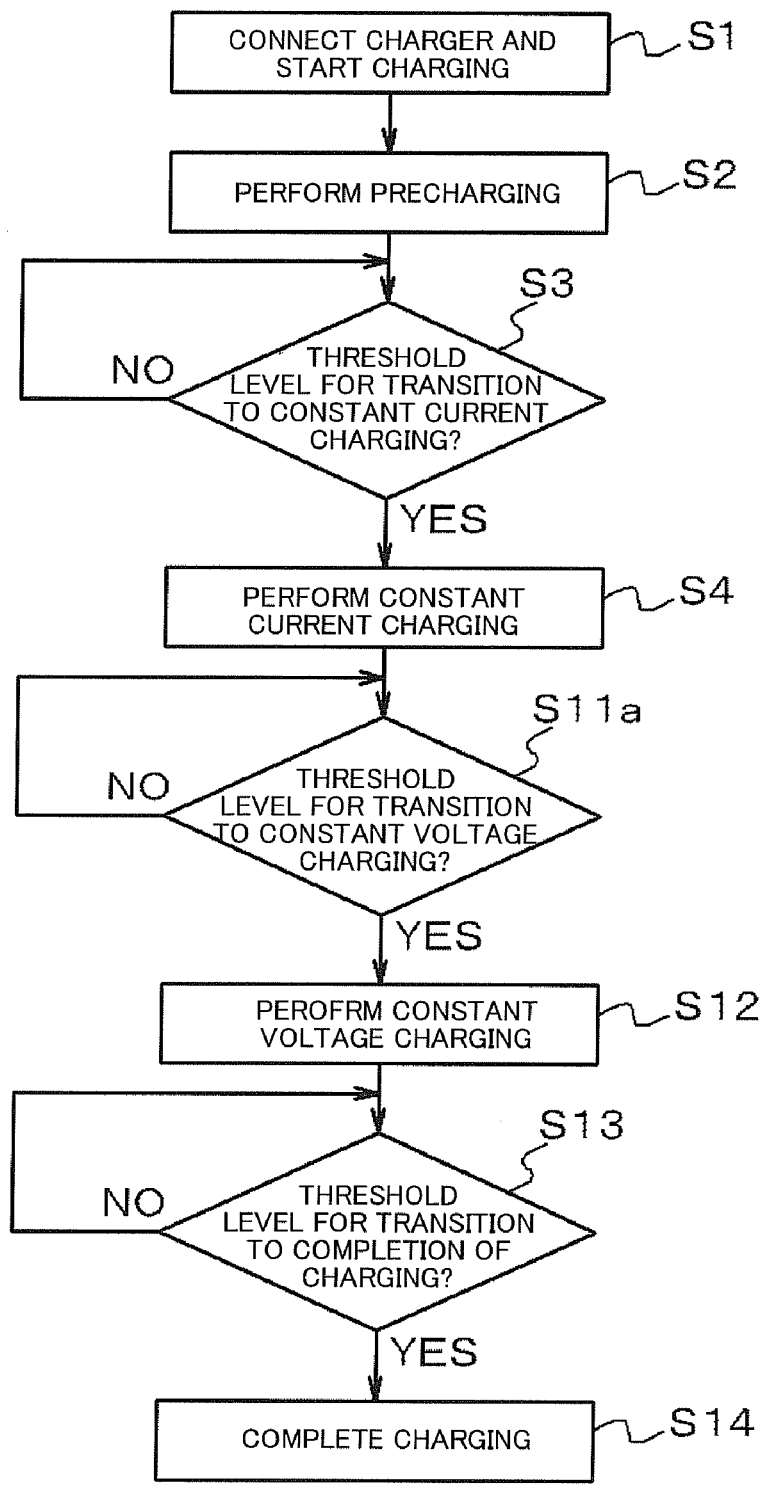
FIG. 8 is a flowchart explaining an operation of the charging circuit in FIG. 7.

FIG. 4 is a block diagram explaining a configuration of other example of the present invention. In the first example described before, the CPU instructs to measure a supply voltage on a charger side and instructs to determine increase of a charging current. In this example, as shown in FIG. 4, a timer 15 is added. Then, the voltage measurement A/D converter 12 is changed to a voltage detection circuit 14 that uses a comparator or the like. Due to this change, a detected voltage of the voltage detection circuit 14 is set to a charging current maintaining determination level and the supply voltage on the charger side is monitored, while increasing the charging current step by step at certain intervals using counts of the timer 15 by the charging control circuit 11a, as charging current step control at a time of starting constant current charging.

The charging current is maintained when the detection voltage of this voltage detection circuit 14 has reached a predetermined detection voltage or lower. For this reason, the charging is not stopped even in the charging that uses a charger having a low charging current supply capability, and charging of the battery can be therefore performed. An effect similar [to that in the first example] can be thereby obtained.

When CPU control is not performed as in this second example, the voltage on the charger side is detected at an approximately certain level, using a voltage detector or the like. Charging can be thereby performed with the charging current close to the optimal current on the charger side. However, it is difficult to stably perform the charging with the charging current that is constant for a long time. However, under CPU control, a set value of the charging current in the constant current charging and the voltage value on the charger side are grasped. Thus, the charging with the charging current optimal for the charger becomes possible.

Further, the CPU 13 grasps a value of the charging current and the voltage value on the charger side. Thus, in the case of the charger with a low supply capability, an announcement that "the charger is not a normal charger" or "a charging time will be long" can be made to a user. Further, the voltage on the charger side is increased by charging the voltage of the battery. Increase of the charging current according to a charging state of the battery also becomes possible. Optimal charging for the charger and the charging state can be thereby performed.

INDUSTRIAL APPLICABILITY

The present invention can be applied to a battery charging circuit of a cellular phone handset. The present invention can be extensively applied to a common battery as well.

Modifications and adjustments of the exemplary embodiment and the examples are possible within the scope of disclosure (including claims) of the present invention, and further based on the basic technical concept of the invention. Various combinations and selections of various disclosed elements are possible within the scope of the claims of the present invention.

The invention claimed is:

1. A charging circuit that charges a battery from a charging power supply according to a constant current constant voltage charging system, said charging circuit comprising:
    a charging current setting circuit that sets a charging current for each predetermined current level step by step at a time of constant current charging;
    a charging voltage measurement circuit that measures a supply voltage from said charging power supply; and
    a control unit;
    wherein said control unit performs constant current charging by increasing a charging current for said each predetermined current level step by step at the time of the constant current charging, and when said control unit detects one of a plurality of conditions occurring, said control unit stops the increase of the charging current and continues charging maintaining the predetermined minimum voltage,
    wherein the plurality of conditions comprises detection of the supply voltage of the power supply being at a level below a charging current maintaining determination level by step by step decrease of the supply voltage of the power supply along with step by step increase of the charging current.

2. The charging circuit according to claim 1, wherein
    said control unit includes a control element that controls the charging current and a charging voltage of said battery and a control circuit; and
    said control circuit controls said control element so that said control element has a set value of the charging current, and when said control unit detects that the supply voltage from said charging power supply has assumed the predetermined minimum voltage determined by said battery in advance, said control circuit controls said control element so that the increase of the charging current is stopped and the charging is continued maintaining the predetermined minimum voltage.

3. The charging circuit according to claim 2, wherein
    said control circuit includes a CPU, and said CPU stores the set values that control the charging current step by step and the predetermined minimum voltage determined by said battery in advance, and instructs to measure the supply voltage and to make determination with respect to the increase of the charging current.

4. The charging circuit according to claim 1, wherein said charging voltage measurement circuit comprises a voltage measurement A/D converter that measures the supply voltage on a side of said charging power supply.

5. A charging circuit that charges a battery from a charging power supply according to a constant current constant voltage charging system, said charging circuit comprising:
    a charging current setting circuit that sets a charging current for each predetermined current level step by step at a time of constant current charging;
    a voltage detection circuit which detects that a supply voltage from said charging power supply has assumed a predetermined minimum chargeable voltage determined by said battery in advance; and
    a control unit;
    wherein said control unit performs constant current charging by increasing the charging current for said each predetermined current level step by step at the time of the constant current charging, and when said voltage detection circuit detects one of a plurality of conditions occurring, said control unit stop the increase of the charging current and continues charging maintaining the predetermined minimum voltage, wherein the plurality of conditions comprises detection of the supply voltage of the charging power supply being at a level below a charging current maintaining determination level by step by step decrease of the supply voltage of the charging power supply along with step by step increase of the charging current.

6. The charging circuit according to claim 5, wherein said control unit includes a control element that controls the charging current and a charging voltage of said battery and a control circuit; and said control circuit controls said control element so that said control element has a set value of the charging current, and when said voltage detection circuit detects the predetermined minimum voltage, said control circuit controls said control element so that the increase of the charging current is stopped and the charging is continued maintaining the predetermined minimum voltage.

7. The charging circuit according to claim 6, wherein said control circuit includes a CPU, and said CPU instructs to make determination with respect to the increase of the charting current.

8. The charging circuit according to claim 6, wherein said control circuit controls the charging current step by step based on a time set by a timer.

9. The charging circuit according to claim 2, wherein said control element comprises an FET connected between said charging power supply and said battery.

10. The charging circuit according to claim 1, wherein said charging current setting circuit comprises a constant current reference D/A converter that sets the charging current to be controlled for said each predetermined current level step by step.

11. The charging circuit according to claim 1, wherein the charging circuit is for a battery for a cellular phone handset, and is adapted to charge said battery for said cellular phone handset.

12. A charging method of charging a battery from a charging power supply according to a constant current constant voltage charging system, said charging method comprising:

increasing a charging current for each predetermined current level step by step at a time of constant current charging, thereby performing the constant current charging; and stopping the increase of the charging current and continuing the charging maintaining a predetermined minimum chargeable voltage determined by said battery in advance, when one of a plurality of conditions has occurred, wherein the plurality of conditions comprises detection of the supply voltage of the charging power supply being at a level below a charging current maintaining determination level by step by step decrease of the supply voltage of the charging power supply along with step by step increase of the charging current.

13. The charging method according to claim 12, wherein in a process of increasing the charging current step by step, said method comprises:

measuring the supply voltage from said charging power supply in each step; and detecting that the supply voltage from said charging power supply has assumed the predetermined minimum chargeable voltage determined by said battery.

14. The charging method according to claim 13, comprising:

determining whether or not to increase the charging current, based on a result of measurement of the supply voltage from said charging power supply;

increasing the charging current for said each predetermined current level step by step when it is determined that the charging current may be increased; and stopping the increase of the charging current and maintaining the charging current when it is determined that the charging current cannot be increased.

15. The charging method according to claim 12, wherein the method is for charging a battery for a cellular phone handset, and is adapted to charge said battery for said cellular phone handset.

* * * * *